(12) United States Patent
Lin et al.

(10) Patent No.: US 11,988,830 B2
(45) Date of Patent: May 21, 2024

(54) HEAD UP DISPLAY (71) Applicant: Coretronic Corporation, Hsin-Chu (TW)

(72) Inventors: Shih-Yi Lin, Hsin-Chu (TW); Yu-An Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/838,274

(22) Filed: Jun. 13, 2022

(65) Prior Publication Data
US 2023/0025573 A1 Jan. 26, 2023

Related U.S. Application Data (60) Provisional application No. 63/222,452, filed on Jul. 16, 2021.

(30) Foreign Application Priority Data

Nov. 15, 2021 (CN) .......................... 202111346454.0

(51) Int. Cl.
*G02B 27/01* (2006.01)
*G02F 1/1335* (2006.01)

(52) U.S. Cl.
CPC ..... *G02B 27/0101* (2013.01); *G02B 27/0149* (2013.01); *G02F 1/133528* (2013.01)

(58) Field of Classification Search
CPC ............ G02B 27/0101; G02B 27/0149; G02F 1/133528
USPC .......................................................... 349/11
See application file for complete search history.

(56) References Cited

U.S. PATENT DOCUMENTS

| 9,580,015 B2 | 2/2017 | Aboshi |
| 10,656,415 B2 | 5/2020 | Kuzuhara et al. |
| 10,901,207 B2 | 1/2021 | Choi et al. |
| 2012/0105808 A1 | 5/2012 | Feng et al. |

(Continued)

FOREIGN PATENT DOCUMENTS

| CN | 108292047 | 7/2018 |
| CN | 108919496 | 11/2018 |

(Continued)

OTHER PUBLICATIONS

Toyobo Co.,Ltd, "Toyobo product: COSMOSHINE SRF® (Super Retardation Film)", retrieved on Aug. 27, 2021, pp. 1-3. Available at: https://www.toyobo-global.com/seihin/film/kogyo/optics/optics_03.html.

(Continued)

*Primary Examiner* — Charles S Chang
(74) *Attorney, Agent, or Firm* — JCIPRNET (57) ABSTRACT A head up display including an image-light source, at least one reflector and a light modulation device is provided. The image-light source is configured to provide an image light. The at least one reflector is configured to transmit the image light to leave the head up display. On the transmission path of the image light, the light modulation device is disposed in the head up display. An ambient light enters the image-light source after passing through the light modulation device, and a light energy of the ambient light entering the image-light source is less than or equal to 25% of a light energy of the ambient light entering the head up display.

10 Claims, 5 Drawing Sheets

(56) References Cited

U.S. PATENT DOCUMENTS

| | | | |
|---|---|---|---|
| 2015/0098029 A1 | 4/2015 | Sato et al. | |
| 2017/0199381 A1 | 7/2017 | Kuwabara | |
| 2018/0348515 A1* | 12/2018 | Kuzuhara | B60K 37/04 |
| 2019/0258059 A1 | 8/2019 | Takahashi | |
| 2019/0265472 A1* | 8/2019 | Sugiyama | G02B 6/0025 |
| 2020/0012099 A1* | 1/2020 | Kim | B60J 1/02 |
| 2020/0026073 A1 | 1/2020 | Nambara | |
| 2020/0124848 A1* | 4/2020 | Habermehl | G02B 27/0149 |
| 2020/0201043 A1* | 6/2020 | Sugiyama | G02B 27/0149 |
| 2021/0325670 A1 | 10/2021 | Chen | |
| 2021/0356774 A1* | 11/2021 | Nakanishi | G02B 27/0101 |
| 2022/0121028 A1* | 4/2022 | Smeeton | G02B 27/283 |
| 2023/0375821 A1 | 11/2023 | Lee et al. | |

FOREIGN PATENT DOCUMENTS

| | | |
|---|---|---|
| CN | 110908124 | 3/2020 |
| CN | 112255810 | 1/2021 |
| CN | 112444982 | 3/2021 |
| CN | 112835198 | 5/2021 |
| CN | 114063291 | 2/2022 |
| CN | 114077065 | 2/2022 |
| CN | 114460744 | 5/2022 |
| DE | 102005020233 | 11/2006 |
| EP | 3525038 | 8/2019 |
| JP | 2020144306 | 9/2020 |
| TW | 201805693 | 2/2018 |
| TW | 201837539 | 10/2018 |
| TW | 202030520 | 8/2020 |

OTHER PUBLICATIONS

3M Display Materials & Systems Divsion, "3M Product: Visible-light Reflective PGU (VRP)", 2021 Technical Data, 2021, pp. 1-2.

"Office Action of Taiwan Counterpart Application", dated Dec. 8, 2022, p. 1-p. 5.

Wikipedia, "Liquid crystal display", retrieved on Nov. 15, 2022, Available at: https://web.archive.org/web/20210205132316/en.wikipedia.org/wiki/Liquidcrystal_display, pp. 1-3.

"Search Report of Europe Counterpart Application", dated Nov. 25, 2022, p. 1-p. 9.

"Office Action of Taiwan Related Application, Application No. 111129828", dated Mar. 8, 2023, p. 1-p. 11.

"Search Report of Europe Related Application, Application No. 23173553.1", dated Nov. 2, 2023, p. 1-p. 7.

* cited by examiner

HEAD UP DISPLAY

CROSS-REFERENCE TO RELATED APPLICATION

This application claims the priority benefits of U.S. provisional application Ser. No. 63/222,452, filed on Jul. 16, 2021, and China application serial no. 202111346454.0, filed on Nov. 15, 2021. The entirety of each of the above-mentioned patent applications is hereby incorporated by reference herein and made a part of this specification.

BACKGROUND

Technical Field

The disclosure relates to a head up display.

Description of Related Art

The development of display technology in recent years has driven a large number of head up displays to be used in life. In particular, head up displays presenting information superimposed on environmental images are often used in airplanes, vehicles, and shop windows. Taking a head up display for a vehicle as an example, the head up display uses the inner surface of the windshield as an optical combiner to provide the driver with information. Therefore, when driving, the driver may see the information provided by an in-vehicle information system without looking down at the dashboard or navigator.

Since head up displays are mostly used outdoors, sunlight converges to the internal display panel through the imaging lenses of the head up display, which may cause the internal temperature to be above the upper limit (about 100 degrees to 110 degrees) that the display panel may withstand. Generally, the light energy density of sunlight is 1050 W/m$^2$. When sunlight converges to a small area of the display panel, the light energy density will be higher than 20000 W/m$^2$ to 60000 W/m$^2$, resulting in the temperature of the display panel being above 105 degrees. Such a temperature may cause damage to the display panel and reduce the service life of the head up display. Therefore, there is an urgent need to develop a technology that may prevent a large amount of sunlight from entering a head up display.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

A head up display is provided, which may prevent a large amount of ambient light from entering the head up display, and prevent the head up display from being damaged by long-term exposure to the ambient light.

According to an embodiment of the disclosure, a head up display is provided, and the head up display includes an image-light source, at least one reflector, and a light modulation device. The image-light source is configured to provide an image light. The at least one reflector is configured to transmit the image light to leave the head up display. The light modulation device is disposed on the transmission path of the image light, and is disposed in the head up display. An ambient light enters the image-light source after passing through the light modulation device, and a light energy of the ambient light entering the image-light source is less than or equal to 25% of a light energy of the ambient light entering the head up display.

In an embodiment, when the ambient light is transmitted through the light modulation device to the image-light source, a polarization state of the ambient light includes a linear polarization state and an elliptical polarization state, includes a linear polarization state and a circular polarization state, or includes a linear polarization state and a non-polarized state.

In an embodiment, the light modulation device includes a first linear polarizer, a phase modulator, and a second linear polarizer, which are sequentially disposed on the transmission path of the ambient light entering the image-light source.

In an embodiment, the phase modulator is a quarter wave plate.

In an embodiment, a transmission axis of the first linear polarizer and the slow axis of the quarter wave plate form an included angle.

In an embodiment, the phase modulator is a depolarizer.

In an embodiment, the image-light source further includes a display device, and the display device includes a liquid crystal panel and a third linear polarizer. In addition, a transmission axis of the second linear polarizer is parallel to a transmission axis of the third linear polarizer.

In an embodiment, the transmission axis of the first linear polarizer is parallel to the transmission axis of the second linear polarizer.

In an embodiment, the image light leaving the head up display is transmitted to a reflective screen, and the image light is reflected on the reflective screen to enter eyes. The image light is reflected on the reflective screen after passing through the first linear polarizer, and a polarization state of the image light reflected on the reflective screen is a first polarization state.

In an embodiment, a dust cover is further included. The dust cover is disposed between the reflective screen and the image-light source, and is configured to prevent dust from falling into the head up display.

In an embodiment, on the transmission path of the ambient light, the first linear polarizer of the light modulation device is disposed on the dust cover, and the phase modulator and the second linear polarizer are disposed on a display device of the image-light source.

Based on the aforementioned, the head up display provided by the embodiments of the disclosure modulates the ambient light to change the optical characteristics of the ambient light by using the light modulation device, so as to reduce a light energy entering the head up display and prevent the head up display from being damaged by long-term exposure to the ambient light.

In order to make the aforementioned features and advantages of the disclosure more comprehensible, embodiments accompanied with drawings are specifically described in detail as follows.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The foregoing and other technical content, features, and effects of the disclosure are clearly presented in the following detailed description of a preferred embodiment with reference to the accompanying drawings. Directional terms such as top, bottom, left, right, front or back, etc. mentioned in the following embodiments are only directions for referring to the accompanying drawings. Therefore, the directional terms used are for illustration rather than limitation of the disclosure.

Figure 1:
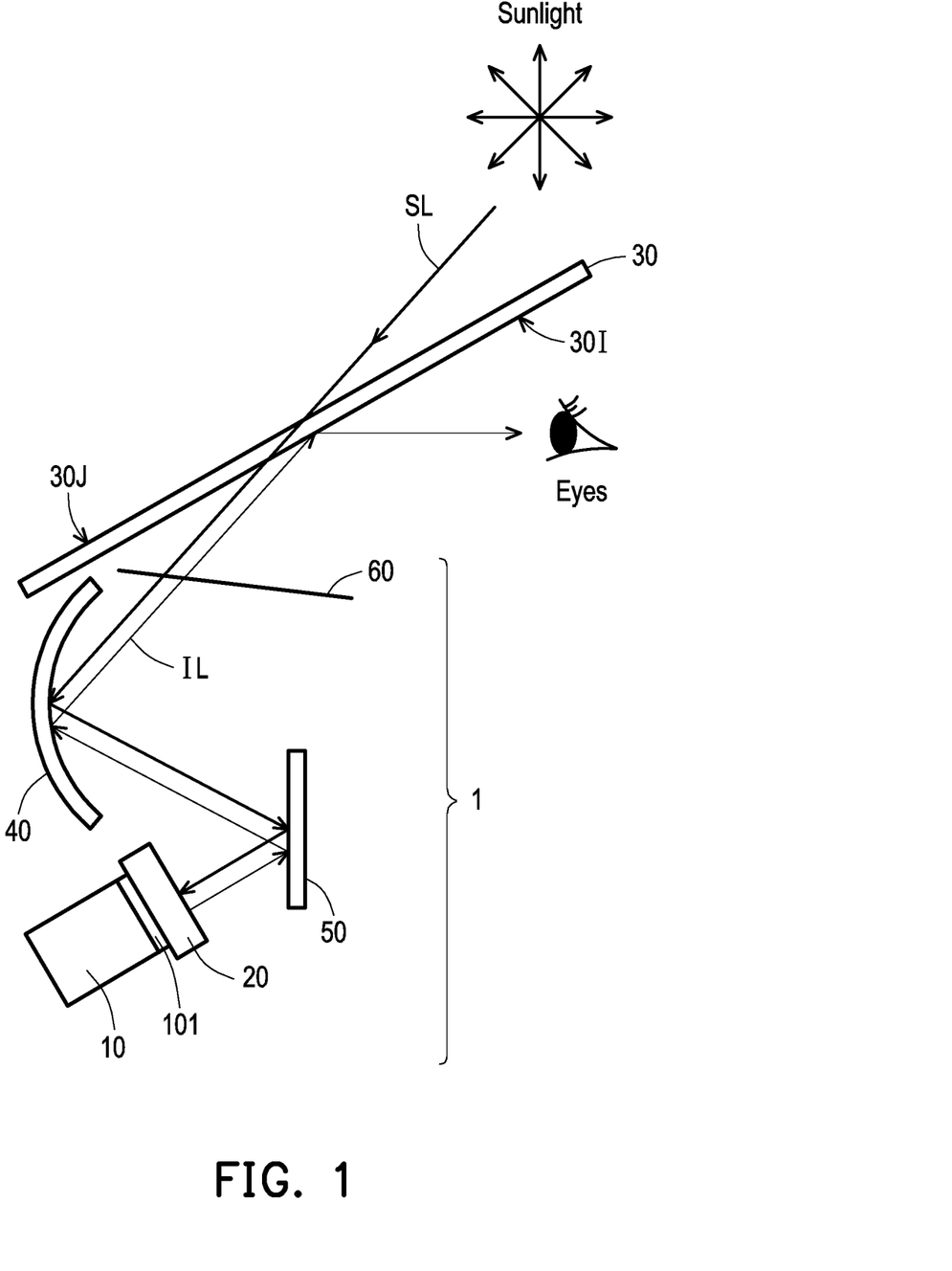
FIG. 1 is a schematic diagram of a head up display according to an embodiment of the disclosure.

Please refer to FIG. 1, FIG. 1 is a schematic diagram of a head up display according to an embodiment of the disclosure. The head up display 1 includes an image-light source 10, a light modulation device 20, and at least one reflector (40 and 50). The image-light source 10 includes a display device 101. The display device 101 includes a liquid crystal panel. The image-light source 10 is configured to provide an image light IL. Through the at least one reflector (40 and 50), the image light IL is transmitted to a surface 301 of a reflective screen 30 and is reflected to eyes of user. On the transmission path of the image light IL, the at least one reflector (40 and 50) is disposed between the image-light source 10 and the eyes. The light modulation device 20 is disposed in the head up display 1.

In other embodiments, a head up display 1 includes an image-light source 10, a light modulation device 20, and a single reflector 40 or 50. The image-light source 10 is configured to provide an image light IL. Through the single reflector 40 or 50, the image light IL is transmitted to a reflective screen 30 and is reflected to eyes of user. The reflector 40 or 50 may be, for example, a flat reflector, a convex reflector or a concave reflector, and the required reflector is disposed according to a design of the image light path.

In one embodiment, a head up display 1 is implemented as the head up display for a vehicle, and a reflective screen 30 is implemented as a windshield. In addition, the head up display 1 further includes a dust cover 60. The surface 301 of the reflective screen 30 corresponds to the surface of the windshield inside the vehicle, and the surface 30J corresponds to the surface of the windshield outside the vehicle. The image light IL enters the eyes of the driver after being reflected on the surface of the windshield inside the vehicle, and the image light IL entering the eyes forms a virtual image in front of the eyes of driver. The dust cover 60 is, for example, a transparent plastic cover, and the material of the dust cover 60 is, for example, polyethylene terephthalate (PET). The dust cover is configured to prevent dust from falling into the head up display 1, that is, the dust may not touch the image-light source 10, the light modulation device 20, and the single reflector 40 or 50. On the transmission path of the image light IL, the light modulation device 20 is disposed between the image-light source 10 and the dust cover 60.

To prevent a large amount of ambient light (such as sunlight) from entering the head up display 1, and causing the display device 101 to be damaged due to high temperature. On the transmission path of the image light IL, the light modulation device 20 of the head up display 1 is disposed between the image-light source 10 and the reflective screen 30. The light modulation device 20 is configured to modulate the phase and polarization state of an incident light, and then a polarization selection element is configured to select a specific polarization state so as to reduce a light energy of the light passing through the light modulation device 20. In the embodiment shown in FIG. 1, on the transmission path of the image light IL, the light modulation device 20 is disposed between the display device 101 and the reflector 40 or 50 to reduce a light energy of an ambient light SL passing through the light modulation device 20. Thus, the light energy of the ambient light SL entering the image-light source 10 is less than or equal to ($\leq$) 25% of the light energy of the ambient light SL entering the head up display 1, thereby reducing the temperature raised by the ambient light SL irradiating the display device 101.

In an embodiment of the disclosure, a light modulation device 20 is, for example, a sun light filter (SLF). The light modulation device 20 includes a first linear polarizer, a phase modulator, and a second linear polarizer, which are sequentially disposed on the transmission path of an ambient light SL entering an image-light source 10. The ambient light SL is non-polarized light. It should be noted that non-polarized light is not a light without a polarization direction, but the polarization direction changes very quickly with time. After the ambient light SL passes through the first linear polarizer, part of the ambient light SL of which polarization direction is parallel to an absorption axis of the first linear polarizer is absorbed by the first linear polarizer, and the part of the ambient light SL passing through the first linear polarizer is a linear polarized light. The polarized light may be S-polarized light or P-polarized light. In general, a light energy of the part of the ambient light SL absorbed as mentioned above accounts for about 50% of a light energy of the original ambient light SL. In other words, the light energy of the part of the ambient light SL passing through the first linear polarizer accounts for about 50% of the light energy of the original ambient light SL. The phase modulator is disposed between the first linear polarizer and the second linear polarizer. The phase modulator is configured to modulate the phase of the part of the ambient light SL passing through the first linear polarizer, so that the polarization state of the part of the ambient light SL is changed from linear polarization to other polarization states, such as circular polarized light, elliptical polarized light, or non-polarized light. After that, by appropriately arranging a direction of an absorption axis of the second linear polarizer, 50% of the light energy of the part of the ambient light SL is absorbed again. Therefore, a light energy of the part of the ambient light SL passing through the light modulation device 20 is less than or equal to 25% of the light energy of the original ambient light SL. Referring to various embodiments of the disclosure, how a light modulation device reduces a light energy of an ambient light entering a head up display 1 is specifically described in the following.

Figure 2A:
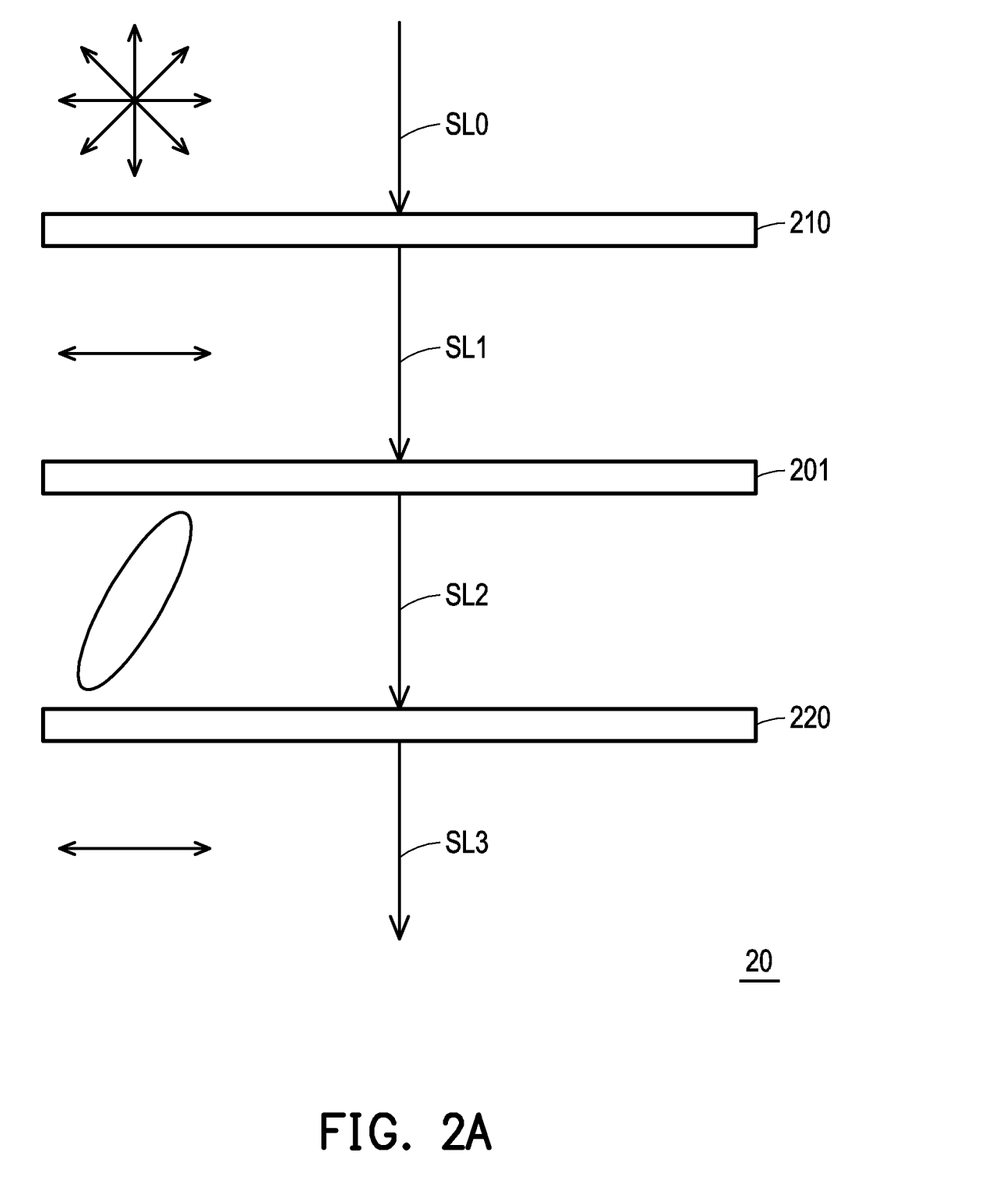
FIG. 2A, FIG. 2B, and FIG. 2C are schematic diagrams of a light modulation device according to embodiments of the disclosure.

Please refer to FIG. 2A, FIG. 2A is a schematic diagram of a light modulation device according to an embodiment of the disclosure. The light modulation device 20 includes a first linear polarizer 210, a phase modulator 201, and a second linear polarizer 220, which are sequentially disposed on the transmission path of an ambient light SL0, SL1, SL2, SL3 (for ease of description, hereinafter referred to as the original ambient light SL0). In the embodiment, the phase modulator 201 is a quarter wave plate. In addition, a transmission axis of the first linear polarizer 210 and a slow axis of the quarter wave plate form an included angle, which is greater than 0 degrees and less than 45 degrees. An ambient light SL1 passing through the first linear polarizer 210 (hereinafter referred to as part of the ambient light SL1) is a linear polarized light. An ambient light SL2 which passes through the phase modulator 201 and is modulated by the phase modulator 201 (hereinafter referred to as part of the ambient light SL2) is an elliptical polarized light. Since the part of the ambient light SL2 is an elliptical polarized light, a direction of an absorption axis of the second linear polarizer 220 may be arranged, the second linear polarizer 220 may absorb more than 50% of the light energy of the elliptical polarized light. In this case, a light energy of a linear polarized ambient light SL3 passing through the second linear polarizer 220 (hereinafter referred to as part of the ambient light SL3) may be less than or equal to 25% of the light energy of the original ambient light SL0.

Figure 2B:
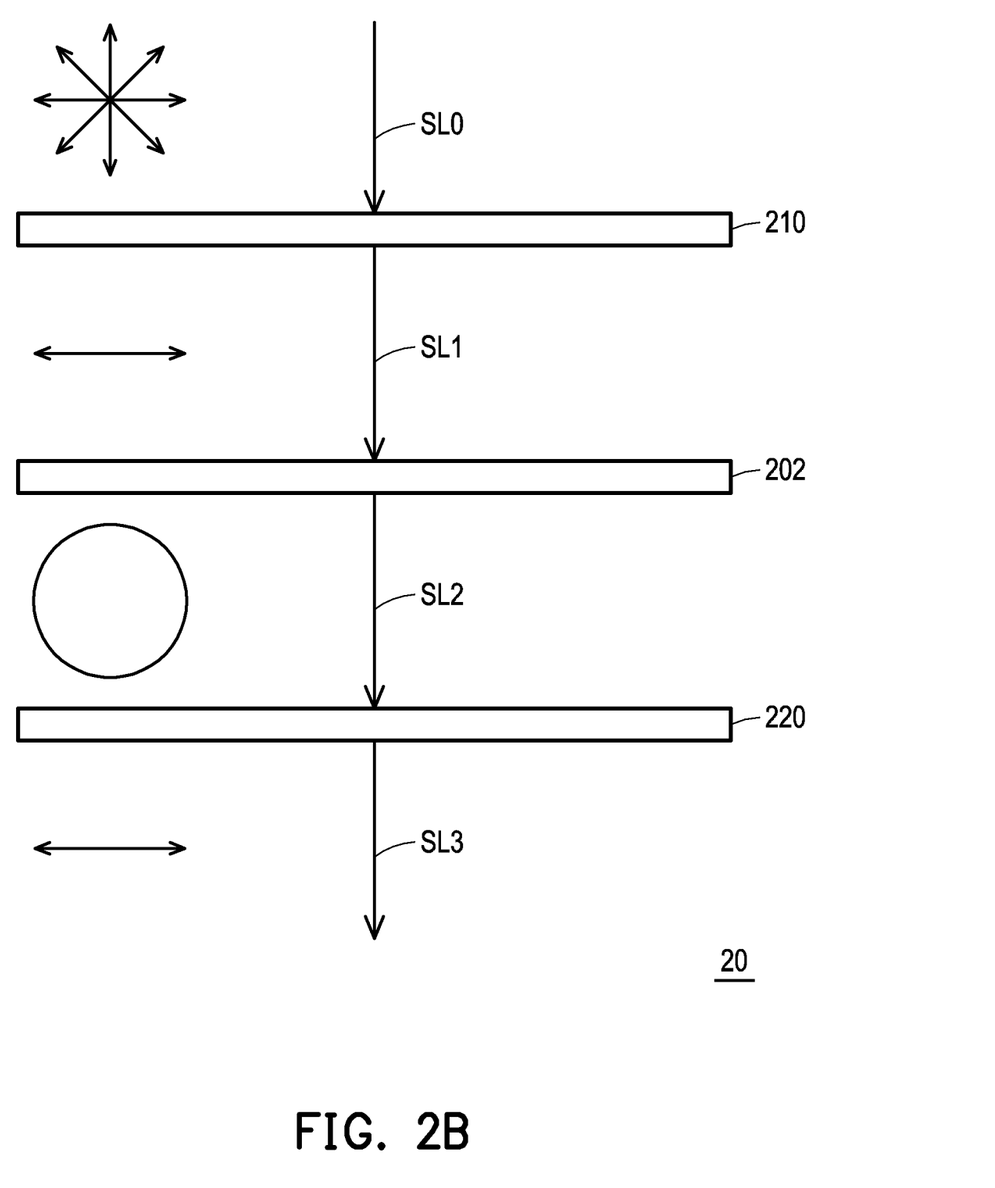

Please refer to FIG. 2B, FIG. 2B is a schematic diagram of a light modulation device according to an embodiment of the disclosure. The light modulation device 20 includes the first linear polarizer 210, a phase modulator 202, and the second linear polarizer 220, which are sequentially disposed on the transmission path of the original ambient light SL0 and part of the ambient light SL1, SL2, SL3. The embodiment is the same as the embodiment shown in FIG. 2A in that the phase modulator 202 is a quarter wave plate. The embodiment is different from the embodiment shown in FIG. 2A in that the transmission axis of the first linear polarizer 210 and the slow axis of the quarter wave plate form an included angle, which is 45 degrees. The part of the ambient light SL2 which passes through the phase modulator 202 and is modulated by the phase modulator 202 is a circular polarized light. After the part of the ambient light SL2 passes through the second linear polarizer 220, the part of the ambient light SL3 is generated. A light energy of the part of the ambient light SL3 is 25% of the light energy of the original ambient light SL0.

Please refer to FIG. 1 and FIG. 2B at the same time. In an embodiment of the disclosure, the head up display 1 includes the light modulation device 20 as shown in FIG. 2B. The first linear polarizer 210, the phase modulator 202, and the second linear polarizer 220 of the light modulation device 20 are stacked and disposed on the image-light source 10, and the image-light source 10 includes the display device 101 shown in FIG. 1. The display device 101 includes the liquid crystal panel and an upper polarizer (the third linear polarizer). The transmission axis of the second linear polarizer 220 of the light modulation device 20 is parallel to a transmission axis of the upper polarizer of the display device 101. As a result, during the process of passing through the light modulation device 20, the image light IL has higher transmittance without being absorbed.

In another embodiment of the disclosure, the transmission axis of the second linear polarizer 220 of the light modulation device 20 is parallel to the transmission axis of the upper polarizer of the display device 101, and is parallel to the transmission axis of the first linear polarizer 210. As a result, the image light IL has higher transmittance during the process of passing through the light modulation device 20. However, the disclosure is not limited to the aforementioned. In some embodiments of the disclosure, an included angle among the transmission axis of the first linear polarizer 210, the transmission axis of the second linear polarizer 220, and the transmission axis of the upper polarizer of the display device 101 may be adjusted according to the intensity of the image light IL and the intensity of the ambient light SL.

In yet another embodiment of the disclosure, the transmission axis of the first linear polarizer 210, the transmission axis of the second linear polarizer 220, and the transmission axis of the upper polarizer of the display device 101 are parallel. After passing through the first linear polarizer 210, the image light IL is reflected on the reflective screen 30. The image light IL reflected on the surface 301 of the reflective screen 30 is, for example, a first polarization state, that is, the S polarization state, which improves the reflectance of the image light IL and increases the light energy entering the eyes of driver.

Figure 2C:
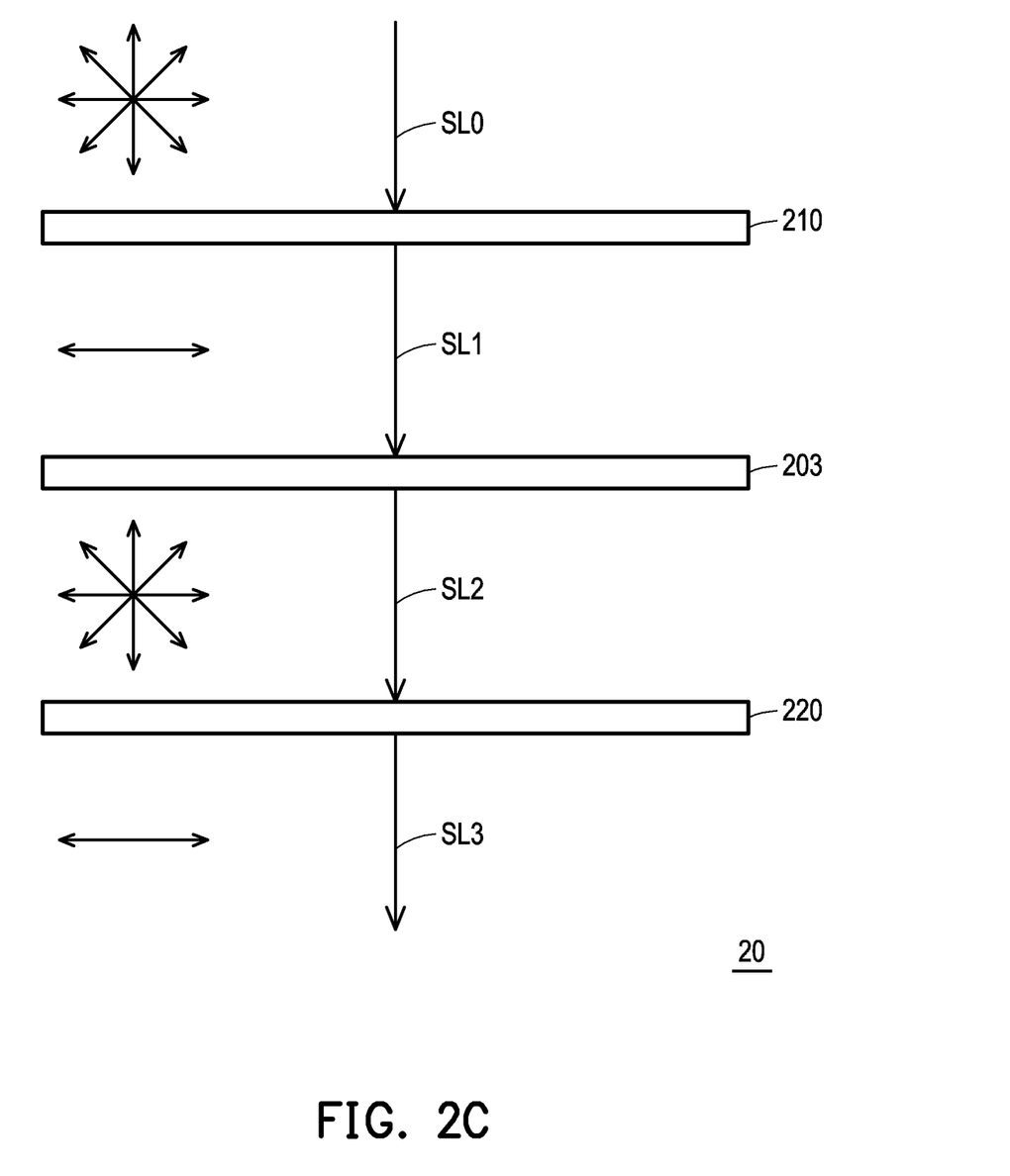

Please refer to FIG. 2C, FIG. 2C is a schematic diagram of a light modulation device according to an embodiment of the disclosure. The light modulation device 20 includes the first linear polarizer 210, a phase modulator 203, and the second linear polarizer 220, which are sequentially disposed on the transmission path of the original ambient light SL0 and part of the ambient light SL1, SL2, SL3. The embodiment is different from the embodiment shown in FIG. 2A in that the phase modulator 203 is a depolarizer, so that the part of the ambient light SL2 passing through the phase modulator 203 is a non-polarized light. After the part of the ambient light SL2 passes through the second linear polarizer 220, the part of the ambient light SL3 is generated. A light energy of the part of the ambient light SL3 is 25% of the light energy of the original ambient light SL0.

Figure 3:
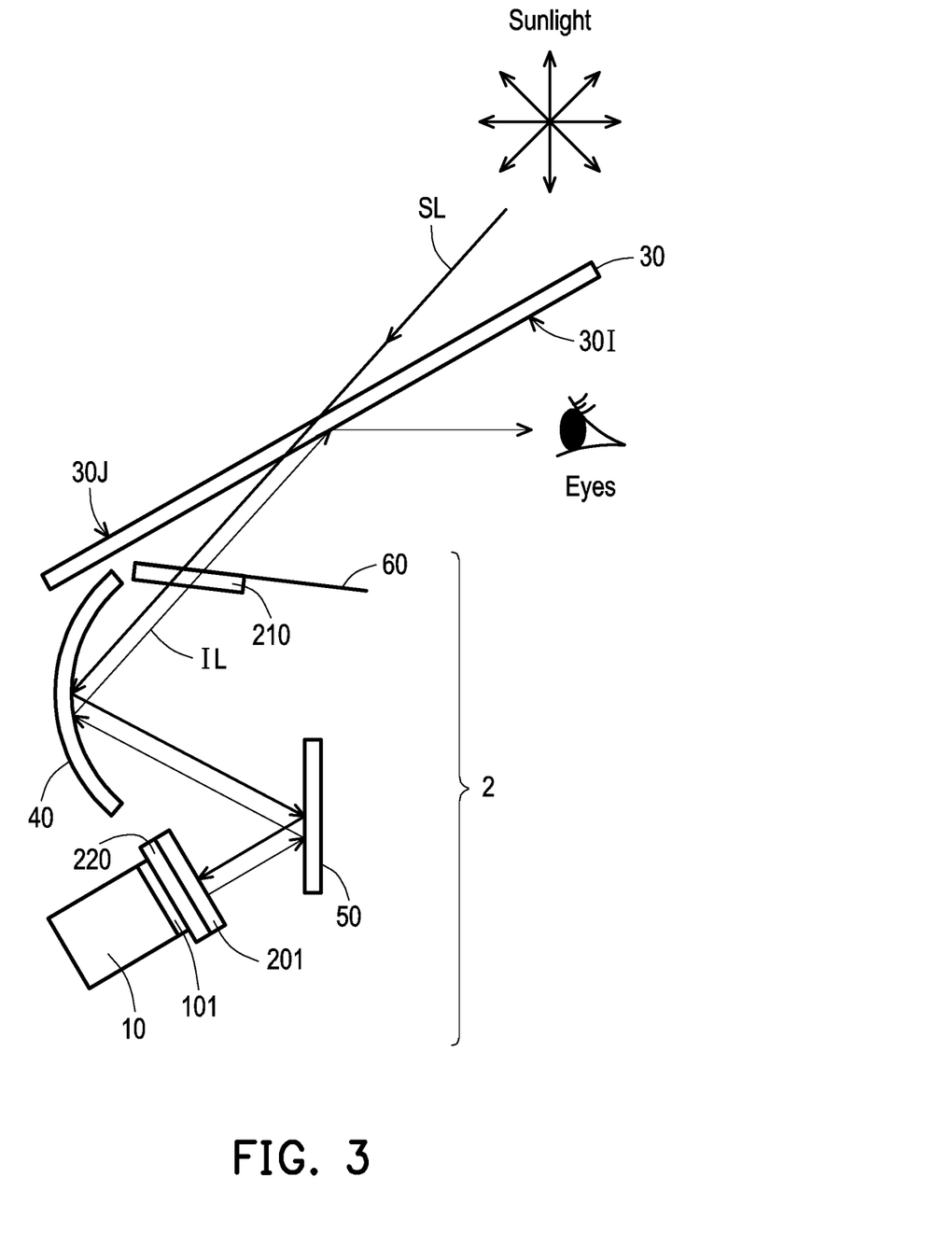
FIG. 3 is a schematic diagram of a head up display according to another embodiment of the disclosure.

Please refer to FIG. 3, FIG. 3 is a schematic diagram of a head up display according to another embodiment of the disclosure. The head up display 2 is different from the head up display 1 in the embodiment shown in FIG. 1 in that the light modulation device in the head up display 2 is implemented based on the above-described light modulation device 20 shown in FIG. 2A, and that on the transmission path of the image light IL, the reflectors 40 and 50 in the head up display 2 are disposed between the first linear polarizer 210 and the phase modulator 201, the reflectors 40 and 50 are configured to change the transmission direction of the image light IL and reduce the overall volume of the head up display 2. The first linear polarizer 210 of the light modulation device 20 is disposed on the dust cover 60. The phase modulator 201 and the second linear polarizer 220 of the light modulation device 20 may be adhered together and disposed on the light-emitting surface of the display device 101. However, the disclosure is not limited to the aforementioned. In an unshown embodiment of the disclosure, on the transmission path of the ambient light SL, the first linear polarizer 210, the phase modulator 201, and the second linear polarizer 220 of the light modulation device 20 may be respectively disposed between the reflective screen 30 and the display device 101. When the light modulation device 20 is disposed on the display device 101, the light modulation device 20 may be fixed by an adhesion method or a mechanism (frame) without the necessity of directly contacting the display device 101, and a distance is kept between the display device 101 and the light modulation device 20. In other embodiments, the first linear polarizer 210 and the phase modulator 201 of the light modulation device 20 may be disposed on the dust cover 60, and the second linear polarizer 220 is disposed on the light-emitting surface of the display device 101. In another embodiment, the elements of the light modulation device 20 are all disposed on the dust cover 60.

In summary, the head up display provided by the embodiments of the disclosure modulates an ambient light by using a light modulation device to change the optical characteristics of the ambient light in order to reduce a light energy entering the head up display and to prevent the head up display from being damaged by long-term exposure to the ambient light.

However, the aforementioned are merely exemplary embodiments of the disclosure, and should not be used to limit the scope of implementation of the disclosure, that is, simple equivalent changes and modifications made in accordance with the scope of the claims of the disclosure and the description of the disclosure are all still within the scope of the disclosure. In addition, any embodiment or claim of the disclosure does not have to achieve all the objectives or advantages or features disclosed in the disclosure. Moreover, the abstract and the title are only used to assist the search of patent documents rather than being used to limit the claims of the disclosure. Furthermore, the terms "first" and "second" mentioned in this specification or the claims are merely used to name elements or to distinguish different embodiments or scopes rather than being used to limit the upper or lower limit of the number of the elements.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A head up display, comprising:
   an image-light source, configured to provide an image light;
   at least one reflector, configured to transmit the image light to leave the head up display; and
   a light modulation device, disposed in the head up display, and disposed on a transmission path of the image light, wherein the light modulation device is configured to reduce a light energy of an ambient light after the ambient light passes through the light modulation device, and wherein the image-light source is disposed on a transmission path of the ambient light such that the ambient light enters the image-light source after the ambient light passes through the light modulation device,
   wherein a polarization state of the ambient light during transmitting through the light modulation device comprises a linear polarization state and a non-polarized state.

2. The head up display according to claim 1, wherein the phase modulator is a quarter wave plate.

3. The head up display according to claim 2, wherein a transmission axis of the first linear polarizer and a slow axis of the quarter wave plate form an included angle.

4. The head up display according to claim 1, wherein the phase modulator is a depolarizer.

5. The head up display according to claim 1, wherein the image-light source further comprises a display device, and the display device comprises a liquid crystal panel and a third linear polarizer, and a transmission axis of the second linear polarizer is parallel to a transmission axis of the third linear polarizer.

6. The head up display according to claim 5, wherein a transmission axis of the first linear polarizer is parallel to the transmission axis of the second linear polarizer.

7. The head up display according to claim 1, wherein the image light leaving the head up display is transmitted to a reflective screen, and the image light is reflected on the reflective screen to enter eyes, wherein the image light is reflected on the reflective screen after passing through the first linear polarizer, and a polarization state of the image light reflected on the reflective screen is a first polarization state.

8. The head up display according to claim 7, further comprising:
   a dust cover, disposed between the reflective screen and the image-light source, and is configured to prevent dust from falling into the head up display.

9. The head up display according to claim 8, wherein on the transmission path of the ambient light, the first linear polarizer of the light modulation device is disposed on the dust cover, and the phase modulator and the second linear polarizer are disposed on a display device of the image-light source.

10. The head up display according to claim 1, wherein the light modulation device comprises a first linear polarizer, a phase modulator, and a second linear polarizer, which are sequentially disposed on the transmission path of the ambient light entering the image-light source, and the ambient light only passes through the light modulation device once.

* * * * *